United States Patent [19]

Smith et al.

[11] Patent Number: 4,871,945
[45] Date of Patent: Oct. 3, 1989

[54] AUTOMATIC BRAKE LIGHT FLASHING ELECTRIC MODULE AND CIRCUIT

[76] Inventors: Robert W. Smith, 35 N. Harwood Ave., Upper Darby, Pa. 19082; Stanislaw Bodziuch, 52 Shadeland Ave., Drexel Hill, Pa. 19026

[21] Appl. No.: 153,042

[22] Filed: Feb. 8, 1988

[51] Int. Cl.⁴ .................... B60Q 1/42; H05B 37/00
[52] U.S. Cl. .................... 315/77; 315/200 A; 307/10.8
[58] Field of Search ............. 315/200 A, 77, 209 R, 315/225, 226, 240, 245, 120; 307/10 LS, 132 E, 157

[56] References Cited

U.S. PATENT DOCUMENTS

| | | | |
|---|---|---|---|
| 3,940,657 | 2/1976 | Kasiewicz et al. | 315/200 A X |
| 4,258,292 | 3/1981 | Kassfeldt | 315/200 A |
| 4,389,597 | 6/1983 | Krumrein | 315/200 A |
| 4,654,562 | 3/1987 | Berdat | 315/200 A |

*Primary Examiner*—James J. Groody
*Assistant Examiner*—Mark R. Powell
*Attorney, Agent, or Firm*—Lipton, Famiglio & Elman

[57] ABSTRACT

This device is an electronic module activated by a vehicle's existing brake light switch which, when electrically connected to a motor vehicle's brake light circuit, will flash the brake lights several times before continuous illumination. In the preferred embodiment described, the brake lights flash each time the vehicle's brakes are applied.

2 Claims, 1 Drawing Sheet

AUTOMATIC BRAKE LIGHT FLASHING ELECTRIC MODULE AND CIRCUIT

BACKGROUND OF THE INVENTION

1. Field of the Invention

The present invention pertains to motor vehicle safety. More particularly, it relates to increasing awareness of a motor vehicle's brake lights.

The driver of a vehicle is often confronted with numerous distracting stimuli. Most motor vehicles and trailer vehicles are required to have red brake lights, which light up when a driver depresses the brake pedal of the vehicle to signal to other drivers that a vehicle is slowing or stopping. The brake lights remain illuminated so long as the brake pedal is depressed. Most motor vehicles and trailer vehicles are also required to have red tail lights, which are intended to make the back end of the vehicle visible to other drivers. The tail lights remain illuminated when the driver switches on his headlights.

Sometimes drivers have difficulty distinguishing the red brake lights from the red tail lights on a vehicle that is slowing or stopping. This difficulty is especially present at night, when the red tail lights of a vehicle are always illuminated. This failure to notice brake lights results in accidents and injury due to "rear end" collisions. It is therefore desirable to have some method by which the brake light warning of the slowing of a vehicle can be accentuated.

The present invention serves that purpose. When activated by the vehicle's existing brake light switch, the present invention causes the brake lights to flash several times before normal continuous illumination occurs. It produces such an effect each time the brakes are applied. By drawing attention to a car that is slowing down, the present invention provides the driver of a car behind the slowing vehicle a greater period of time to begin to slow down or stop and avoids "rear end" collisions. The present invention can be employed on a variety of vehicles, such as cars, trailers or snow mobiles. The present invention may also be employed in other lighting and warning systems where a flashing sequence is useful to signal changing conditions.

It is, therefore, the principal object of the present invention to provide a programmed combined flasher and continuous lighting means for use with vehicle brake light systems and other warning or lighting systems.

It is also an object of the present invention to provide a method of producing a foot-operated lighting sequence.

It is a further object to provide for a foot-activated flashing system module that can be inserted into existing brake light systems as a complete unit without altering substantially the existing brake light circuitry. It is also an object of the present invention to provide a means to produce an intermittent control signal for a predetermined number of cycles of two alternating states followed by a continuous signal all triggered by a single step voltage event.

2. Description of Prior Art

Applicants are aware of no present devices that provide for flashing of brake lights prior to illumination. Currently, brake lights illuminate when the operator of the vehicle depresses the brake pedal and extinguish when the pedal is released. Current applicants are presently aware of a simple brake switch/brake light arrangement with no flashing capability. In addition, the prior art contains various examples of flasher mechanisms that are not adapted for use with a motor vehicle's brake switch and do not have a continuous illumination mode. The present invention uses a unique circuit module to combine a brake switch and light flasher circuit so as to provide for a combined flasher and continuous light system without altering existing brake light circuitry.

SUMMARY OF THE INVENTION

The present applicants' device is an electric module which will control a motor vehicle brake light when activated by the vehicle's existing brake switch.

When the vehicle operator applies foot pressure to a motor vehicle's brake pedal, a 12 V DC voltage enters the module circuit board and activates a sequence of voltage pulses thereby causing the brake light to flash a predetermined number of times and then remain lit. When the operator releases foot pressure from the brake pedal, the brake light will go off. This module can be contained within the brake light housing as a complete unit, (with the exception of the actuator), or it can be spliced into the wires leading to the vehicle's existing brake light. A crucial characteristic of the invention is the fact that the module can be integrated into existing brake light systems without altering the configuration of the existing electrical wiring of the vehicle. A further desireable characteristic of the present invention is the "fail-safe" design that has been utilized because of the intended application in the preferred embodiment. Specifically, it is important that a brake light circuit utilized in an automobile or in other transportation devices be particularly reliable. In addition, and beyond reliability, such a device must be designed so that any possible anticipated failure of the device will not cause a failure of the underlying basic indication system. The electronic circuit disclosed with the present invention has been designed so that a failure of the active components will allow the brake light of the vehicle to continue to operate in a conventional fashion even if the flashing device failed for some reason. This is an important consideration because a design otherwise may cause a complete failure of the brake lights of the vehicle altogether. This is clearly an unacceptable scenario.

One embodiment of the invention consists of an IC chip, CD4069 or equivalent, a series of Variable Resistors, $R_1$, $R_2$, $R_3$, and $R_4$, fusing Resistor $R_5$, Trim Resistors $R_6$, and $R_7$, and a series of Capacitors, Diodes and a Relay.

The operation of the module starts with a direct current input voltage that passes through a variable resistor. The voltage passing through the variable resistor charges a first capacitor. The input voltage is also simultaneously applied to the output terminal through a normally closed relay actuated switch. After the first capacitor has charged high enough, a signal goes high at a first pin of the IC chip and is inverted at a second pin. The signal continues through a third pin connected to the second pin and is inverted at a fourth pin. A second capacitor is then charged through a resistor. The signals cause a bias voltage in a relay drive transistor. The relay drive transistor activates a relay that interrupts the power to the output terminal until the voltage across the relay drive transistor is diminished. A series of interruptions cause the flashing effect. The flashing sequence is set at a level so that it completes itself and has no effect on the lighting sequence after the set series of flashes.

DETAILED DESCRIPTION OF THE INVENTION

Figure 1:
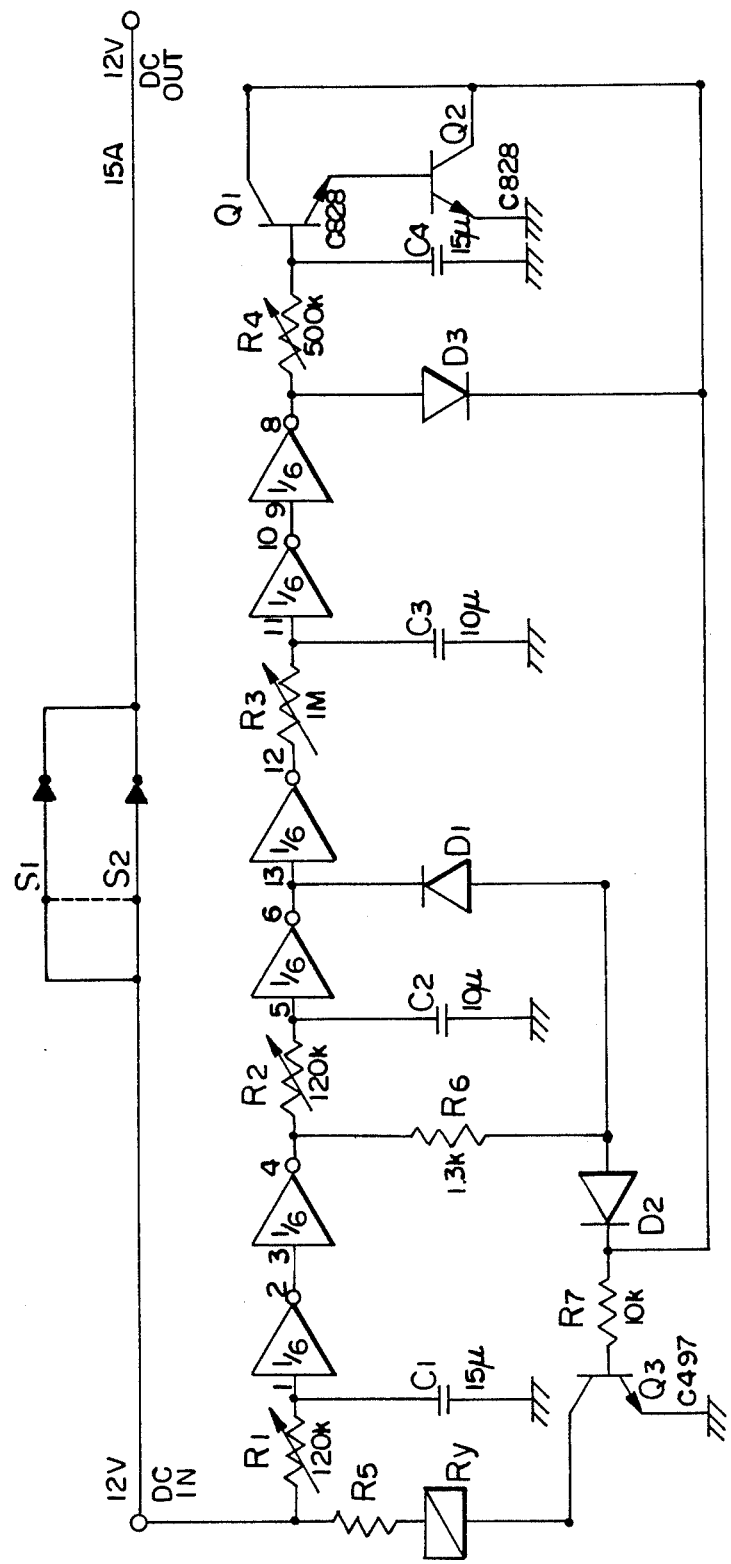
FIG. 1 is a electrical schematic diagram of the preferred embodiment flashing module of the present invention.

The electronic flashing module of FIG. 1 consists of an IC chip CD4069 or equivalent, Variable Resistors $R_1$, $R_2$, $R_3$, $R_4$, shown at 6,8 10 and 12, Fusing Resistor $R_5$, Trim Resistors $R_6$ and $R_7$, Capacitors $C_1$, $C_2$, and $C_3$, Diodes $D_1$, $D_2$, and $D_3$, Transistors $Q_1$, $Q_2$, and $Q_3$ and a Relay $R_y$ including switches $S_1$ $R_4$, Fusing Resistor $R_5$, Trim Resistors $R_6$ FIG. 1.

The values given to components in the drawing are for purposes of example only. Actual values may be varied to alter the length of output voltage, the time between output pulses, the sensitivity of the relay triggers, the input trigger voltage, the current type, and the type of relay used. The IC chip has within single circuitry six gates which are utilized in the fashion set forth in FIG. 1. Although the circuit could actually be constructed using discreet inverting gates, designs today frequently use many of such individual gates within a single integrated circuit such as the chip utilized in the preferred embodiment. For clarity, the individual gates, though shown on FIG. 1 are not separately labeled.

Also, the example shows a 12 V DC input voltage and also a 12 V DC output voltage. This module can be adjusted or otherwise designed to be driven off of any current or voltage provided it is converted to a DC voltage as input, and can drive any type of relay which can control any type of power or signal. Those skilled in the art appreciate that the present circuit may be utilized to provide an alternating signal for any warning indicator, whether auditory or visual.

The following is a step-by-step description of the drawing.

1. A DC input voltage which could be rectified and filtered from an AC source goes through variable resistor $R_1$ and charges Capacitor $C_1$. At this time, a voltage is applied across the output load.

2. After $C_1$ has charged high enough to cause pin 1 of the IC to go high, pin 2 is inverted to low. Also, Pin 3 goes low because it is connected to pin 2.

3. The signal is inverted at pin 4 goes high, supplying a bias voltage to Transistor $Q_3$, Diode $D_2$, Trim resistor $R_6$, and Base Resistor $R_7$. The high voltage from pin 4 also charges Capacitor $C_2$ through Resistor $R_3$.

4. $Q_3$ activates $R_y$ causing an interruption of power to the output load. Anytime a voltage is placed across $Q_3$ from base to emitter, Relay $R_y$ disconnects power to the output terminal through its switch terminals $S_1$ and $S_2$, until voltage across $Q_3$ is relieved.

5. Pin 5 receives a high signal from pin 4. When pin 5 reaches a high enough voltage, it is inverted at pin 6 to low, which allows $D_1$ to bleed off bias voltage on $Q_3$. Pin 13, connected to pin 6, also goes low.

6 $Q_3$ now deactivates relay $R_y$, allowing input voltage to act across output terminals and across load.

7. The IC inverts pin 13 low to a high signal at pin 12. $C_3$ begins to charge through $R_3$ up to its high voltage on pin 11.

8. The IC inverts pin 11 to a low signal at pin 10 and pin 9.

9. The signal is inverted to a high signal at pin 8, which biases $Q_3$ through $D_3$ and $R_7$ and activates Relay $R_y$ to interrupt the power to the output.

10. Pin 8 charges $C_4$. When totally charged, $C_4$ biases transistor $Q_1$. $Q_1$ is Darlington coupled to $Q_2$. When $Q_1$ is biased, the collectors will go low and cut off voltage to $Q_3$, deactivating Relay $R_y$ and restoring voltage to the output.

When this sequence is completed, $C_4$ is fully charged and $Q_1$ and $Q_2$ are biased. The circuit will be at a resting point, having no effect upon the original circuit existing outside the module. At this point, input voltage gives a voltage across the load and passes to output terminals as if the module was not connected.

This device was designed specifically to be transparent to the functioning of the circuit to which it has been added when the module is stabilized. Secondly, the device was designed as a positive inhibition system which would only interrupt the output voltage when the module created a bias voltage on $Q_3$. If the module malfunctioned and created no bias voltage across $Q_3$, the module would have no effect overall. This was designed as a safety feature. Further, as shown in FIG. 1, the switch interrupting the voltage from the input to the output utilizes both normally closed contacts $S_1$ and $S_2$, in parallel, such that the failure of one contact will not effect the brake light operation. It would be appreciated that a circuit such as the present invention, particularly in the preferred embodiment, cannot add additional potential failure modes to a safety system such as a brake light control. Therefore, the inherent fail-safe feature of the circuit is of particular importance in the design. Those skilled in the art will appreciate that the failure mode of a solid state device includes one of two major conditions. Either the device is internally opened such that it does not function at all, and becomes transparent in the system, or the device shorts across its terminals internally. The present invention discloses a circuit which prevents failure of the existing brake light control system irrespective of the failure of any of the active components in the circuit. Considering device $Q_3$, a failure mode of this transistor would either include an open or shorted condition. In an open condition it would fail to operate allowing the 12 volts present at the input of the circuit to continue to be present at the output since relay $R_y$ would not experience an activation voltage across it. In the alternative, if $Q_3$ were to short internally causing the current to flow from the 12 volt input to ground through $R_y$, resistor $R_5$ is designed to be a fusing resistor such as to burn out disabling the entire circuit. In such an instance, it would be appreciated that the disclosed invention would become transparent to the operation of the brake lights since the 12 volt input would be available at the output and the circuit would only fail to cause the intermittent blinking as it is designed to provide, but would not interfere with the normal operation of the brake lights in any vehicle in which it is installed. In a similar fashion, should any of the solid state devices, including the inverters, fail by developing internal shorts, such an event would simply interfere with the operation of the number of cycles of the flashing as would be appreciated by one skilled in the art. In a similar fashion, the failures of transistors $Q_1$ or $Q_2$, whether opened or shorted, would not interfere with the ultimate operation of the brake lights, but simply interfere with the interruption of the output voltage of the circuit, or would shorten the number of cycles of interruption originally provided.

Although the present invention has en described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed is:

1. An electric control module which comprises:
   a means for coupling an input voltage to a relay actuator;
   a relay terminal switch which routes input voltage to an output voltage port;
   said relay actuator operatively connected to said relay terminal switch to interrupt the output voltage;
   a means for coupling said relay actuator to a transistor which, when activated, closes the relay;
   a charging circuit to create an increasing voltage over time;
   a means that senses said increasing voltage and outputs an inverted pulse at a given voltage level;
   a means for coupling said charging circuit to said inverting means;
   a means for coupling said inverting means to said transistor
   a means of reinverting said inverted pulse and feeding it back to charge said transistor;
   a means for coupling said reinverting means to a second charging circuit;
   a second charging circuit to create an increasing voltage over time;
   a means for coupling second charging circuit to a second inverting means;
   a second means that senses said increasing voltage and outputs an inverted pulse;
   a means of feeding said inverted pulses back to discharge said transistor; and
   a means of keeping said transistor in a deactivated state after a given time interval.

2. An electric control module which comprises:
   an input port for the input of a voltage;
   an output port electrically connected to said input port through a relay driven, normally closed electrical switch;
   an electrically activated relay operated by a first transistor device wherein the relay is electrically connected across the said input and the output of said first transistor;
   a series of electronic inverter means alternatively switching said first transistor on and off such as to alternatively actuate said relay upon the input of voltage at said input port, a predetermined number of cycles interrupting the voltage at said output port during each cycle.

* * * * *